United States Patent [19]

Wood

[11] 4,261,441

[45] Apr. 14, 1981

[54] WIND TURBINE DAMPER

[75] Inventor: Charles F. Wood, Mississauga, Canada

[73] Assignee: DAF Indal Ltd., Mississauga, Canada

[21] Appl. No.: 36,446

[22] Filed: May 7, 1979

[51] Int. Cl.³ .............................................. F16F 7/08
[52] U.S. Cl. ................................................. 188/1 B
[58] Field of Search ............................ 52/148; 174/42; 188/1 B

[56] References Cited

U.S. PATENT DOCUMENTS

| | | | |
|---|---|---|---|
| 1,145,213 | 7/1915 | Remané | 188/1 B X |
| 2,889,011 | 6/1959 | Weaver | 174/42 X |
| 3,414,089 | 12/1968 | Schneider | 188/1 B |
| 4,039,050 | 8/1977 | Bowling et al. | 188/1 B |

*Primary Examiner*—Duane A. Reger
*Attorney, Agent, or Firm*—Ivor M. Hughes

[57] ABSTRACT

A wind turbine is provided, incorporating guy wires for support, the improvement comprising single or double acting dampers operating in single or multiple planes, applied to the guy wires for the absorption of energy from the guys that are caused to vibrate laterally in any plane under the influence of fluctuating loads imparted to them by the wind turbine.

2 Claims, 4 Drawing Figures

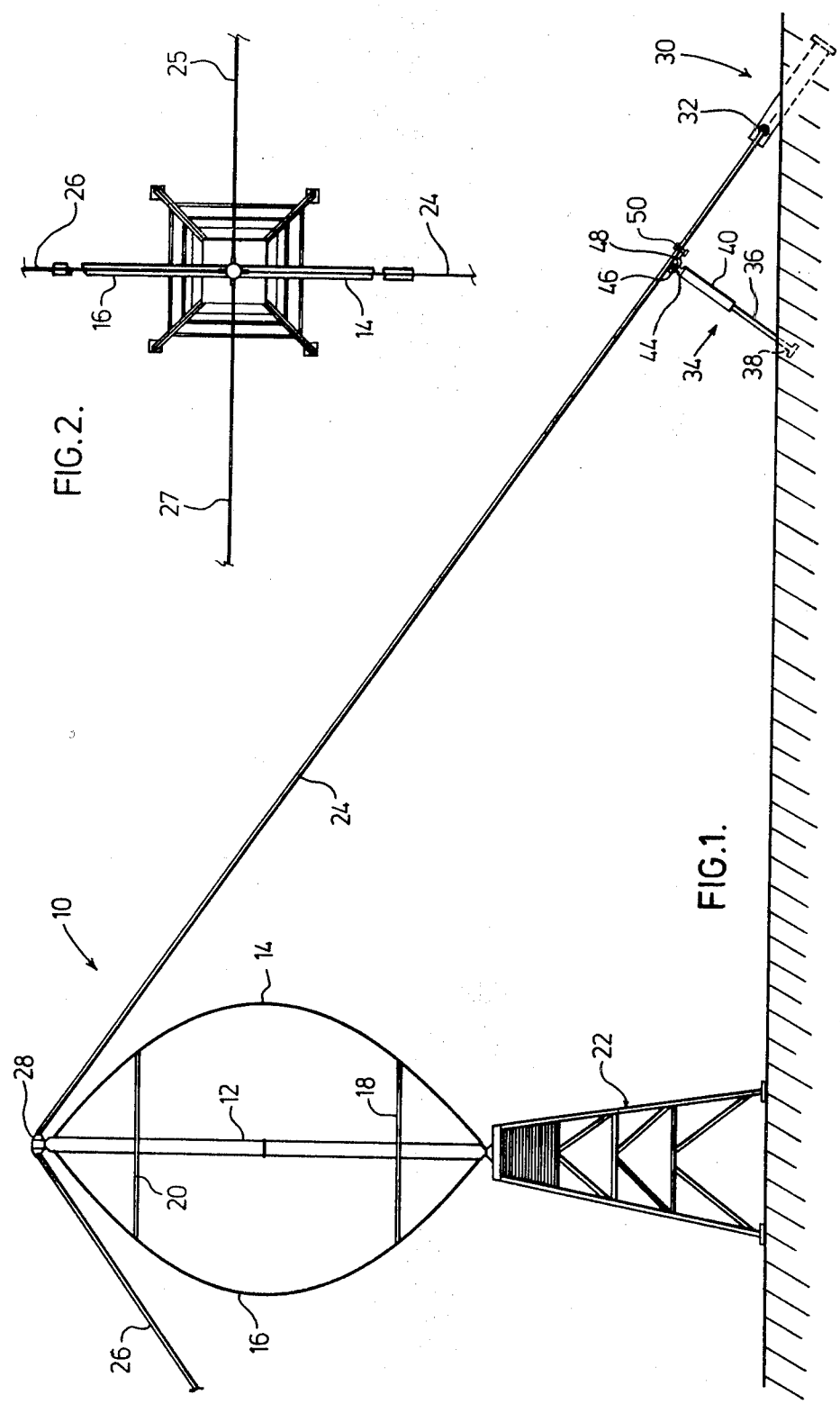

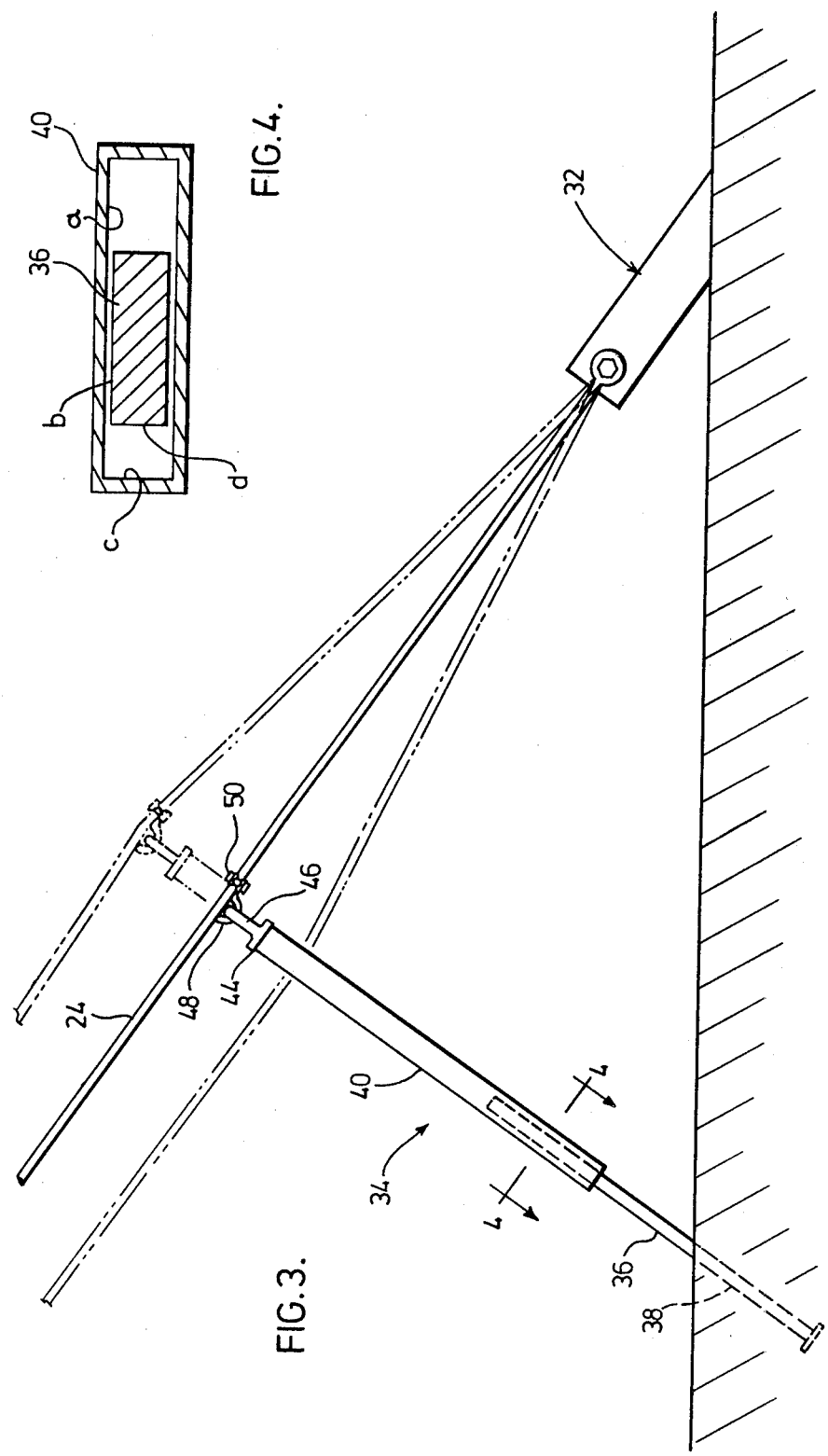

WIND TURBINE DAMPER

FIELD OF INVENTION

This invention relates to vertical axis wind turbines and particularly supports therefor.

BACKGROUND OF THE INVENTION

Vertical axis wind turbines require guy wires for their support and continued support during operation. Particularly, the guys must withstand fluctuating loads applied thereto—the severity and disposition of the fluctuating loads dependent upon a number of parameters, including the operating speed of the rotor or rotors, temperature, wind speed, guy tension, and accumulation of ice (where existing). While attempts to overcome the problem of fluctuating loads have been made, no one proposal has been entirely satisfactory. Particularly, extremely high tensions have been applied to the guys (in the order of in excess of 16,000 pounds by Sandia Laboratories, Albuquerque, N.Mex. to elevate the natural frequency (1st mode) of the guys above the loading frequency generated by the wind turbine (two(2) per revolution). However, the increased tension decreases the efficiency of the wind turbine because of increased wear and tear to, and internal friction of, the structure.

It is therefore an object of this invention, to provide an improved control for the guys on the application of fluctuating loads.

It is a further object of this invention to provide an improved control for the guys which permits the safe operation of wind turbines, at reduced guy tensions, thereby decreasing the wear and tear to, and internal friction of, the structure. For example, the wind turbine tested by Sandia Laboratories at a guy tension of 16,000 pounds can be operated at a guy tension of 5,000 pounds.

Further and other objects of the invention will be realized by those skilled in the art from the following summary of the invention and detailed description of the preferred embodiment thereof.

SUMMARY OF THE INVENTION

In accordance with one aspect of the invention, single or double acting dampers (operating in single or multiple planes) are applied to the guys for supporting a wind turbine for the absorption of energy from guys that are caused to vibrate laterally in any plane under the influence of fluctuating loads, imparted to them by the wind turbine.

Preferably the dampers are secured to the guys at substantially right angles thereto.

DESCRIPTION OF THE DRAWINGS

The invention will now be illustrated with reference to the following drawings of a preferred embodiment of the invention, in which:

FIG. 1 is a side elevation of a wind turbine incorporating a preferred embodiment of the invention;

FIG. 2 is a top view of the structure shown in FIG. 1;

FIG. 3 is a close-up view of part of the structure shown in FIG. 1;

FIG. 4 is a section taken along the line 4-4 of FIG. 3 looking in the direction of the arrows.

DETAILED DESCRIPTION OF THE PREFERRED EMBODIMENT

With reference to FIG. 1, there is shown 50 Kilowatt vertical axis wind turbine 10 having vertical shaft 12 and rotor blades 14 and 16 secured at their respective ends to vertical shaft 12, and intermediate their ends by struts 18 and 20 to vertical shaft 12 and to one another. Vertical shaft 12 is supported for rotation on tower 22 at one end and by guy wires 24, 25, 26 and 27 (See FIG. 2), at the other joined to coupling 28 secured to the top of shaft 12.

Guy wire 24 is anchored to the ground at 30 by anchor 32 under a tension of 3,500 pounds. Guy wires 25, 26 and 27 are anchored in the same way. Double acting dampers 34 are applied to each of guy wires 24, 25, 26 and 27 at substantially right angles thereto (See FIGS. 1 and 3) for absorption of energy from the guys 24, 25, 26, and 27 when they are caused to vibrate laterally in any plane under the influence of fluctuating loads imparted to them by the wind turbine responding to environmental conditions—rain, sleet, snow and wind.

Each of dampers 34 comprises rectangular rod 36 anchored in the ground at 38 (as shown), telescoping into rectangular hollow tubular member 40, inner side wall a of member 40 being considerably larger than outer side b of rectangular member 36 (See FIG. 4) and side c of tubular member 40 being marginally larger than outer side wall d. Tubular member 40 is in turn secured at end 44 by ring assembly 46 welded onto the end of tubular member 40, to guy wire 24 by hook sleeve assembly 48 clamped to the guy wire at 50. When guy wire 24 is caused to laterally vibrate in any direction, the internal surface of member 40 engages the outer surface of stationary member 36 absorbing vibrational energy from the guys by friction when the surfaces slide one over the other.

For example, if the guys had not been damped, in winds of 35 m.p.h., the extent of the lateral vibrational displacement from the mean position of the guy wire would be in excess of 0.3 meters, whereas, with the damping of the guy wire as shown, the extent of lateral vibrational displacement is less than 0.1 meter. Thus the tension in the guy wire is only 3,500 pounds with damping, as compared to 14,000 pounds without damping.

As many changes could be made in the preferred embodiment of the invention without departing from the scope of the invention, it is intended that all matter contained herein be interpreted as illustrative thereof, and not in a limiting sense.

The embodiments of the invention in which an exclusive property or privilege is claimed are as follows:

1. In a wind turbine having guy wires for supporting the wind turbine, the improvement comprising double acting dampers operating in single or multiple planes applied to the guy wires for the absorption of energy from the guys that are caused to vibrate laterally in any plane under the influence of fluctuating loads imparted to them by the wind, each damper comprising two members, one anchored in the ground, the other secured to the guy and fitting over the member anchored in the ground to provide a sliding frictional fit therewith when the guys are caused to vibrate, the one anchored in the ground being rectangular in cross-section and the other a hollow member being rectangular in cross-section and being free to move relative to the anchored member, the length of the longer side of the rectangular cross-section of the other member secured to the guy being considerably larger than the longer side of the rectangular cross-section of the member anchored in the ground, and the smaller side of the rectangular cross-section of the other member secured to the guy being marginally larger than the smaller side of the rectangular cross-section of the member anchored to the ground.

2. The combination of claim 1, wherein the dampers are applied to the guys at substantially right angles to the guys.

* * * * *